United States Patent
Wang et al.

(10) Patent No.: US 10,931,366 B2
(45) Date of Patent: Feb. 23, 2021

(54) DISTRIBUTED SENSING OVER OPTICAL FIBER CARRYING LIVE, HIGH-SPEED DATA

(71) Applicant: NEC Laboratories America, Inc., Princeton, NJ (US)

(72) Inventors: Ting Wang, West Windsor, NJ (US); Ming-Fang Huang, Princeton, NJ (US); Tiejun Xia, Richardson, TX (US); Glenn Wellbrock, Wylie, TX (US); Yaowen Li, Princeton, NJ (US); Philip Ji, Princeton, NJ (US)

(73) Assignees: NEC CORPORATION; VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 16/830,160

(22) Filed: Mar. 25, 2020

(65) Prior Publication Data
US 2020/0313763 A1    Oct. 1, 2020

Related U.S. Application Data

(60) Provisional application No. 62/823,926, filed on Mar. 26, 2019.

(51) Int. Cl.
*H04B 10/071* (2013.01)
*G01M 11/00* (2006.01)
(Continued)

(52) U.S. Cl.
CPC ....... *H04B 10/071* (2013.01); *G01D 5/35358* (2013.01); *G01D 5/35361* (2013.01);
(Continued)

(58) Field of Classification Search
CPC .. G01M 11/08; G01M 11/083; G01M 11/085; G01M 11/086; G01M 11/088; G01M 11/30; G01M 11/31; G01M 11/3109; G01M 11/3118; G01M 11/3127; G01M 11/3136; G01M 11/3145; G01M 11/3154; G01M 11/163; G01M 11/3172;
(Continued)

(56) References Cited

U.S. PATENT DOCUMENTS 8,503,546 B1 * 8/2013 Ashrafi ............... H04L 25/0384
                                                              375/260
9,500,767 B2 * 11/2016 Barfoot ..................... G01V 8/24
(Continued)

FOREIGN PATENT DOCUMENTS

WO    WO-2020059640 A1 *    3/2020    ............ G01M 11/00

*Primary Examiner* — Gordon J Stock, Jr.
(74) *Attorney, Agent, or Firm* — Joseph Kolodka

(57) ABSTRACT

Aspects of the present disclosure describe optical fiber sensing systems, methods and structures disclosing a distributed fiber sensor network constructed on an existing, live network, data carrying, optical fiber telecommunications infrastructure to detect temperatures, acoustic effects, and vehicle traffic—among others. Of particular significance, sensing systems, methods, and structures according to aspects of the present disclosure may advantageously identify specific network locations relative to manholes/handholes and environmental conditions within those manholes/handholes namely, normal, flooded, frozen/iced, etc.

6 Claims, 20 Drawing Sheets

(51) Int. Cl.
*G01D 5/353* (2006.01)
*H04B 10/40* (2013.01)
*H04B 10/2575* (2013.01)
*H04B 10/27* (2013.01)

(52) U.S. Cl.
CPC ..... *G01D 5/35364* (2013.01); *G01D 5/35374* (2013.01); *G01M 11/3109* (2013.01); *H04B 10/25753* (2013.01); *H04B 10/27* (2013.01); *H04B 10/40* (2013.01)

(58) Field of Classification Search
CPC ........... G01M 11/3181; G01M 11/319; G01M 11/33; G01M 11/331; G01M 11/332; G01M 11/333; G01M 11/334; G01M 11/335; G01M 11/336; G01M 11/337; G01M 11/338; G01M 5/0008; G01M 5/0016; G01M 5/0025; G01M 5/0033; G01M 5/0041; G01M 5/0091; G01M 3/38; G01H 9/002; G01H 9/004; G01H 9/006; G01R 31/08; G01R 31/081; G01R 31/083; G01R 31/086; G01R 31/11; G05D 1/021; G05D 2201/02; H04B 10/03; H04B 10/032; H04B 10/034; H04B 10/038; H04B 10/07; H04B 10/071; H04B 10/072; H04B 10/0731; H04B 10/075; H04B 10/077; H04B 10/0771; H04B 10/079; H04B 10/0791; H04B 10/25753; H04B 10/27; H04B 10/40; G02B 6/4463; G02B 6/4467; G02B 6/4469; G02B 6/447; G01L 1/24; G01L 1/242; G01D 5/353; G01D 5/35338; G01D 5/35341; G01D 5/35345; G01D 5/35348; G01D 5/35351; G01D 5/35354; G01D 5/35358; G01D 5/35361; G01D 5/35364; G01D 5/35367; G01D 5/3537; G01D 5/34374; G01V 8/00; G01V 8/005; G01V 8/02; G01V 8/10; G01V 8/12; G01V 8/16; G01V 8/20; G01V 8/24; G01V 1/001; G01V 1/226

See application file for complete search history.

(56) References Cited

U.S. PATENT DOCUMENTS

| | | | |
|---|---|---|---|
| 9,581,490 B2* | 2/2017 | Al-Walaie | G01M 3/047 |
| 10,203,293 B2* | 2/2019 | Lv | G01M 11/30 |
| 10,345,138 B2* | 7/2019 | Milione | G01H 9/004 |
| 10,620,038 B2* | 4/2020 | Wu | G01V 1/18 |
| 10,739,228 B2* | 8/2020 | Li | G01H 9/004 |
| 10,797,789 B2* | 10/2020 | Hu | H04B 10/25 |
| 2010/0310256 A1* | 12/2010 | Shpantzer | H04B 10/61 398/74 |
| 2019/0154468 A1* | 5/2019 | Jansen | G01D 5/3539 |
| 2019/0197846 A1* | 6/2019 | Englund | G08B 13/186 |
| 2020/0124735 A1* | 4/2020 | Huang | G01V 1/001 |
| 2020/0191613 A1* | 6/2020 | Englund | G08B 13/1672 |
| 2020/0200592 A1* | 6/2020 | Huang | G01H 9/004 |
| 2020/0370970 A1* | 11/2020 | Huang | G01M 11/3109 |

* cited by examiner

Backscattering for applications

- Raman: temperature
- Brillouin: temperature and strain
- Rayleigh: vibration/acoustic

| Condition | | Day/night temperature swing | Temperature range |
|---|---|---|---|
|  | Air | Large | Ambient |
|  | Water | Small | > 32°F |
|  | Ice | Small | < 32°F |

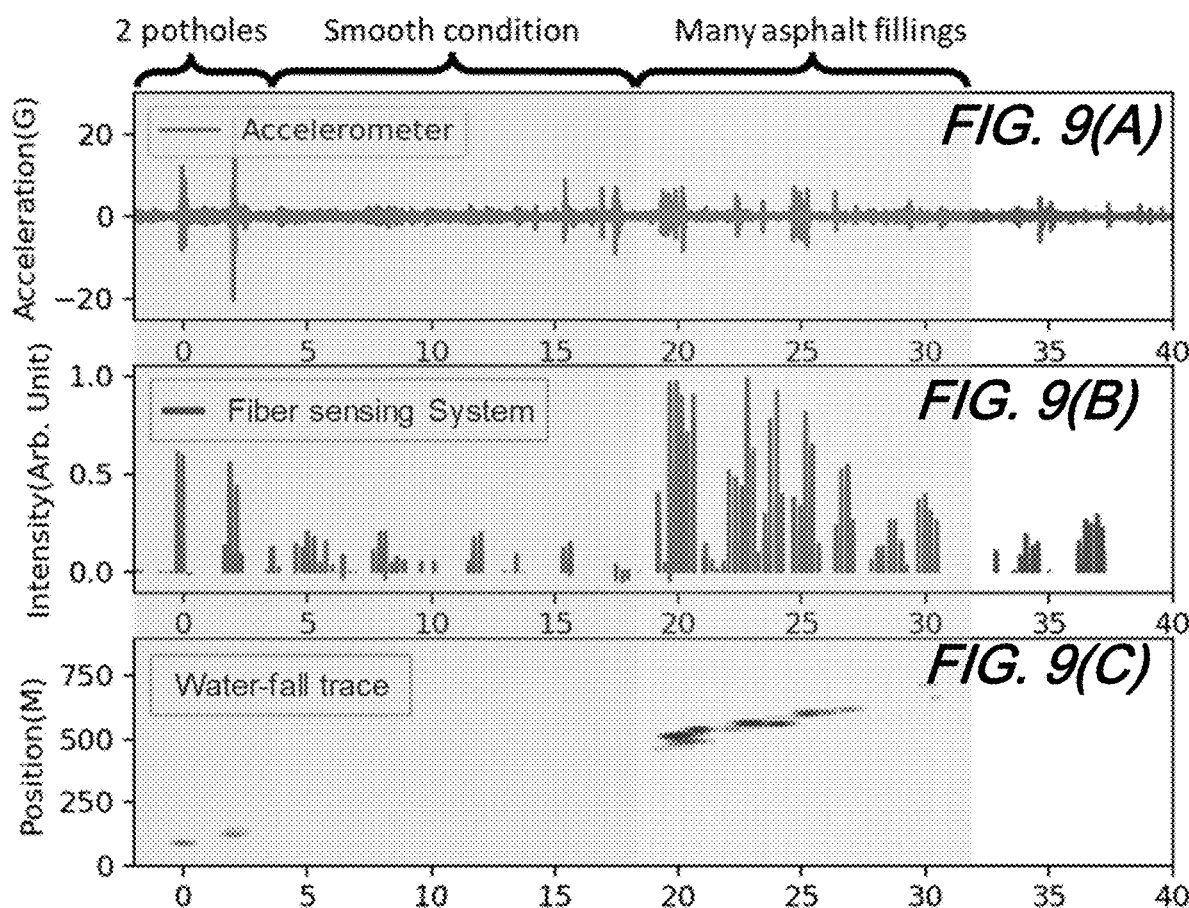

DISTRIBUTED SENSING OVER OPTICAL FIBER CARRYING LIVE, HIGH-SPEED DATA

CROSS REFERENCE

This disclosure claims the benefit of U.S. Provisional Patent Application Ser. No. 62/823,926 filed Mar. 26, 2019 the entire contents of which is incorporated by reference as if set forth at length herein.

TECHNICAL FIELD

This disclosure relates generally to optical communications and optical sensing systems, methods and structures. More particularly, it describes distributed optical fiber sensing systems, methods, and structures and application thereof on optical fiber telecommunications facilities carrying live, high-speed data traffic.

BACKGROUND

As is known in the optical sensing and communications arts, distributed optical fiber sensing involves several related technologies in which an interrogator—generally located within a station—actively generates optical signals, introduces them into an optical fiber, and subsequently detects reflected signals originating along a length of the fiber. Such reflections may originate—for example—as a result of changing environmental conditions that the fiber and/or sensors positioned along its length experience. As such, the optical fiber conveys—via reflected signal(s)—environmental/sensory data back to the interrogator where—using signal processing techniques—the interrogator determines/derives valuable information about environmental conditions along the length of the fiber.

As currently implemented, distributed fiber optic sensing (DFOS or DFS) finds widespread applicability in such diverse applications as infrastructure monitoring, intrusion detection, and environmental monitoring—including earthquake detection.

Contemporary telecommunications carriers have constructed huge-scale optical fiber infrastructures to support incalculable volumes of telecommunications data traffic including that associated with the Internet. Until now, these optical fiber infrastructures have only been used to convey such telecommunications data.

SUMMARY

An advance in the art is made according to aspects of the present disclosure directed to systems, methods, and structures providing distributed fiber optic sensing over optical fiber networks carrying live, high-speed telecommunications signals.

In sharp contrast to the prior art, systems, methods, and structures according to aspects of the present disclosure advantageously employ contemporary optical telecommunications networks to serve as distributed fiber sensing platforms that simultaneously convey live, high-speed telecommunications signals representing the telecommunications data as well as distributed fiber optic sensing (DFOS) signals representing environmental conditions of the optical fiber.

Leveraging Rayleigh and Raman backscattering, systems, methods, and structures according to aspects of the present disclosure allow related physical properties—such as vibration, temperature and acoustic effects—to be sensed at every point along the entire optical fiber cable. By using multiple DFOS systems and optical switches, network-wise sensing features operating over star, ring, mesh, and flexible network topologies may be employed. Moreover, by using a novel 4-channel DFOS system simultaneous detection over multiple routes is enabled.

BRIEF DESCRIPTION OF THE DRAWING

A more complete understanding of the present disclosure may be realized by reference to the accompanying drawing in which:

FIG. 2(A) and FIG. 2(B) are plots showing example distributed temperature sensing (DTS) results to determine/allocate locations of: FIG. 2(A) manholes and buried cables; and FIG. 2(B) aerial cables according to aspects of the present disclosure;

FIG. 8(A), FIG. 8(B), FIG. 8(C), and FIG. 8(D) illustratively show road traffic monitoring in which: FIG. 8(A) is an example of analyzing while comparisons between fiber sensing and video are illustrated in FIG. 8(B) for traffic counts; FIG. 8(C) for speed; FIG. 8(D) a graph showing 5 day road traffic monitoring by fiber sensing, all according to aspects of the present disclosure; and FIG. 9(A), FIG. 9(B), and FIG. 9(C) are a series of graphs showing road surface quality monitoring from: FIG. 9(A) accelerometer; FIG. 9(B) fiber sensing system; and FIG. 9(C) is a waterfall trace according to aspects of the present disclosure.

Figure 1A:
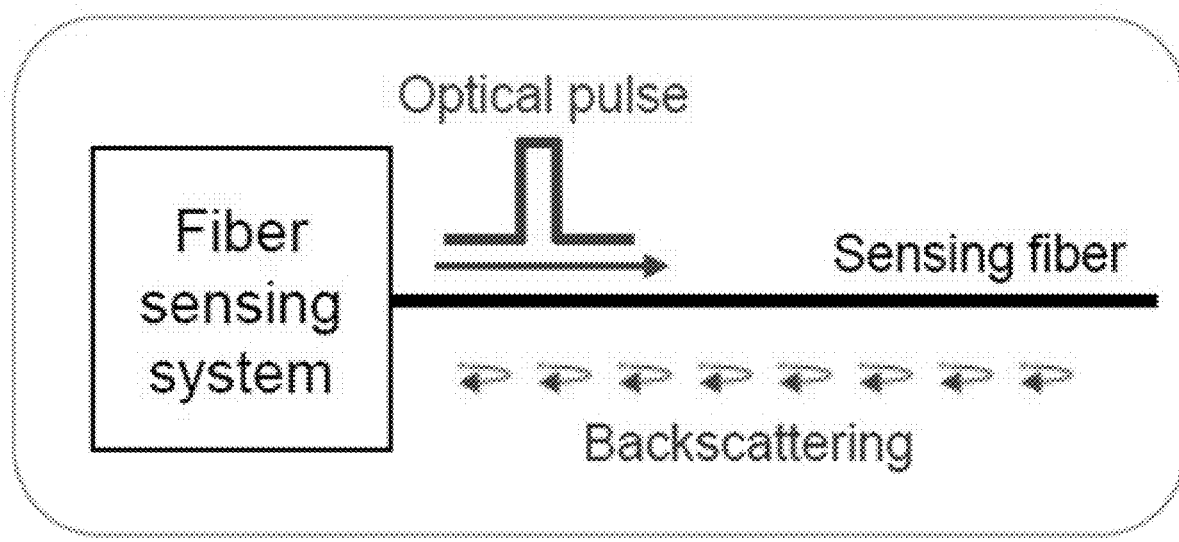
FIG. 1(A) shows a schematic diagram of an illustrative optical fiber sensing arrangement and types of backscatter employed for various applications according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting once more that distributed fiber sensing generally describes systems and methods that include an interrogator system—conveniently and/or centrally located inside a station—which actively generates optical signals, introduces those signals into an optical fiber, and subsequently detects reflected (backscattered) signals that originate along the fiber. Operationally, such fiber acts as a passive link that passes or otherwise conveys environmental information back to the interrogator via the reflected signal(s). By processing the reflected/received signal(s), the interrogator derives information about the environmental conditions along the entire fiber.

In contrast, modern fiber optical telecommunications systems, methods, and structures generally include an optical transmitter to convert an electrical signal into an optical signal to send through the optical fiber, a cable containing bundles of multiple optical fibers that is routed through underground conduits, buildings, and other structures, multiple kinds/types of amplifiers, and an optical receiver to recover the signal as an electrical signal. Telecommunications data transmitted typically includes digital data generated by computers, telephone systems, television/video/other data that when received by an appropriate system, may derive useful items of informational value, i.e., programs, speech, file(s), etc.

The most commonly used optical transmitters are semiconductor devices such as light emitting diodes (LEDs) and laser diodes. The difference between LEDs and laser diodes is that LEDs produce incoherent, while laser diodes produce coherent. For use in optical communications, semiconductor optical transmitters must be designed to be compact, efficient and reliable, while operating in an optimal wavelength range and directly modulated at high frequencies.

The main component of an optical receiver is a photodetector which may convert light into electricity using the photoelectric effect. The primary photodetectors for telecommunications are made from Indium Gallium Arsenide. The photodetector is typically a semiconductor-based photodiode. Several types of photodiodes include p-n photodiodes, p-i-n photodiodes, and avalanche photodiodes. Meal-Semiconductor-Metal (MSM) photodetectors are also used due to their suitability for circuit in regenerators and wavelength-division multiplexers.

Optical-electrical converters are typically coupled with a transimpedance amplifier and a limiting amplifier to produce a digital signal in the electrical domain from the incoming optical signal, which may be attenuated and distorted while passing through the channel. Further signal processing such as clock recovery from data (CDR) performed by a phase-locked loop may also be applied before the data is passed on.

Coherent receivers (used in conjunction with coherent transmitters or combined transmitter/receivers—transceivers) use a local oscillator laser in combination with a pair of hybrid couplers and four photodetectors per polarization, followed by high speed ADCs and digital signal processing to recover data modulated with QPSK, QAM, or OFDM.

Generally, an optical telecommunications transmitter includes a digital-to-analog (DAC), a driver amplifier and a Mach-Zehnder-Modulator (MZM). The deployment of higher modulation formats (>4QAM) or higher Baud rates (>32 GBaud) diminishes the system performance due to linear and non-linear transmitter effects. These effects can be categorized in linear distortions due to DAC bandwidth limitation and transmitter I/Q skew as well as non-linear effects caused by gain saturation in the driver amplifier and the Mach-Zehnder modulator. Digital predistortion counteracts the degrading effects and enables Baud rates up to 56 GBaud and modulation formats like 64QAM and 128QAM with the commercially available components. The transmitter digital signal processor performs digital predistortion on the input signals using the inverse transmitter model before uploading the samples to the DAC Older digital predistortion methods only addressed linear effects. Recent publications also compensated for non-linear distortions. More particularly, some models treat the Mach-Zehnder modulator as an independent system and the DAC and the driver amplifier are modelled by a truncated, time-invariant Volterra series, while other techniques use a memory polynomial to model the transmitter components jointly.

We present this additional telecommunications background to further differentiate telecommunications traffic from distributed fiber sensing data as those are use herein. Such telecommunications traffic and data will employ a transmitter at one end of an optical fiber link and and a receiver at another, different end of the optical fiber link to effect the telecommunications traffic transmission/reception. In contrast, our distribute sensing traffic (optical sensing pulses) is generally sent from one end of the optical fiber employed and backscattered to that same end. Also, such distributed sensing data is of a sensory nature, and not of a more general nature, i.e., eMail, file sharing, video, voice, streaming data traffic, etc., as noted above.

FIG. 1(A) shows a schematic diagram of an illustrative optical fiber sensing (distributed fiber sensing) arrangement and types of backscatter employed for various applications according to aspects of the present disclosure. As may be observed from that figure, different types of backscattering may be preferably employed for different applications. More specifically, Raman backscattering may be employed for temperature sensing application(s), Brillouin backscattering for temperature and/or strain sensing application(s), and Rayleigh backscattering for vibration and/or acoustic sensing application(s).

Advantageously, such distributed fiber optic sensing (DFS) systems may be deployed in wide range of applications such as infrastructure monitoring including bridges, highways, and buildings, intrusion detection, and environmental monitoring including earthquake detection.

As will be readily appreciated by those skilled in the art, telecommunications carriers and service providers have installed vast quantities (excess of 3-4 million fiber cable miles in the US alone) of optical fiber dedicated to communications services. Such fiber may be located in underground conduits, located aerially on poles, and within buildings/communications towers, etc. As we shall show and describe, systems, methods, and structures according to aspects of the present disclosure may be advantageously employed to not only monitor/diagnose/locate operational faults within the fiber for curing telecommunications problems, but may be advantageously employed to provide other—non-telecommunications related sensor data—that may be used to derive additional valuable information as well—even while voluminous amounts of live telecommunications activity occurs in a same optical fiber.

As noted, one aspect of systems, methods, and structures according to aspects of the present disclosure is to monitor the "health"/condition of the optical fiber such that it may be diagnosed/maintained. Consistent with those aspects, we disclose using distributed temperature sensing (DTS) along existing telecommunications infrastructure to allocate fiber position and develop a model/understanding of characteristics of the optical fiber. More particularly, we employ DTS to determine/locate manhole/handhole positions through which the optical fiber passes and then disclose roadway/highway condition determination(s).

We note that with respect to fiber (cable) location procedures, there exist many manholes and handholes along a given optical fiber link. Generally, each such manhole/handhole has associated with it a unique identification (ID) and a recorded geographic location. The distance(s) between adjacent holes are relatively short—typically 1000-2000 feet. As we shall describe, by using DTS a technician may determine where an optical fiber location is relative to those holes.

Figure 1B:
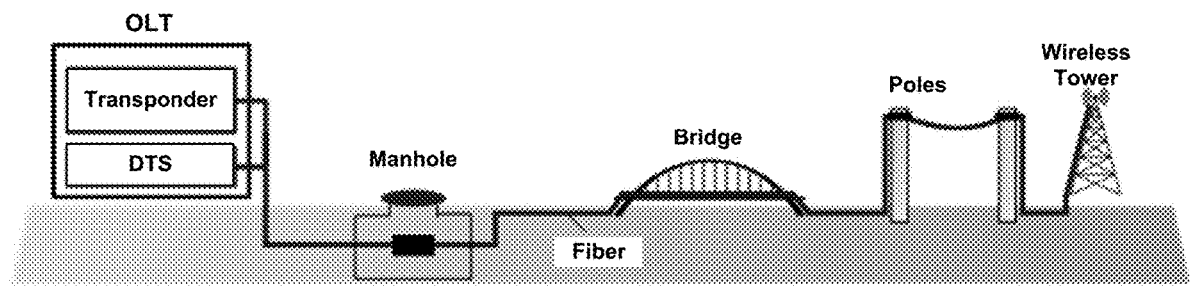
FIG. 1(B) shows a schematic diagram of an illustrative telecommunications optical fiber infrastructure and distributed fiber sensing arrangement employing temperature detection according to aspects of the present disclosure.

Turning now to FIG. 1(B), there is shown a schematic diagram of an illustrative telecommunications optical fiber infrastructure and distributed fiber sensing arrangement employing temperature detection according to aspects of the present disclosure. As shown in that figure, an optical line terminal (OLT) including a transponder and DTS, is optically interconnected with one or more manhole(s)/handhole(s), bridge(s), aerial pole(s), and wireless tower(s) via existing optical telecommunications fiber.

The DTS system provides temperature data/information for locations along the entire fiber infrastructure. For the purposes of this disclosure, two key locations along the optical infrastructure illustrated in the figure are manholes/handholes and aerial poles.

As we shall show and describe, systems, methods, and structures according to aspects of the present disclosure measure temperature distribution(s) along the fiber infrastructure to determine cable position(s) and an understanding of environment existing within the manholes/handholes.

Furthermore—as we have now discovered and disclosed herein—since temperature(s) in manhole(s)/handhole(s) are easily affected by environmental temperature, in most cases the temperature(s) existing in manhole(s)/handhole(s) at a given time are different from temperature(s) determined from buried optical fiber. As we have further now determined, temperature swings from daytime to nighttime for manhole(s)/handhole(s) are larger than buried optical fiber. As a result, the location(s) of manhole(s)/handhole(s) may be advantageously determined from such DTS data.

Figure 2A:
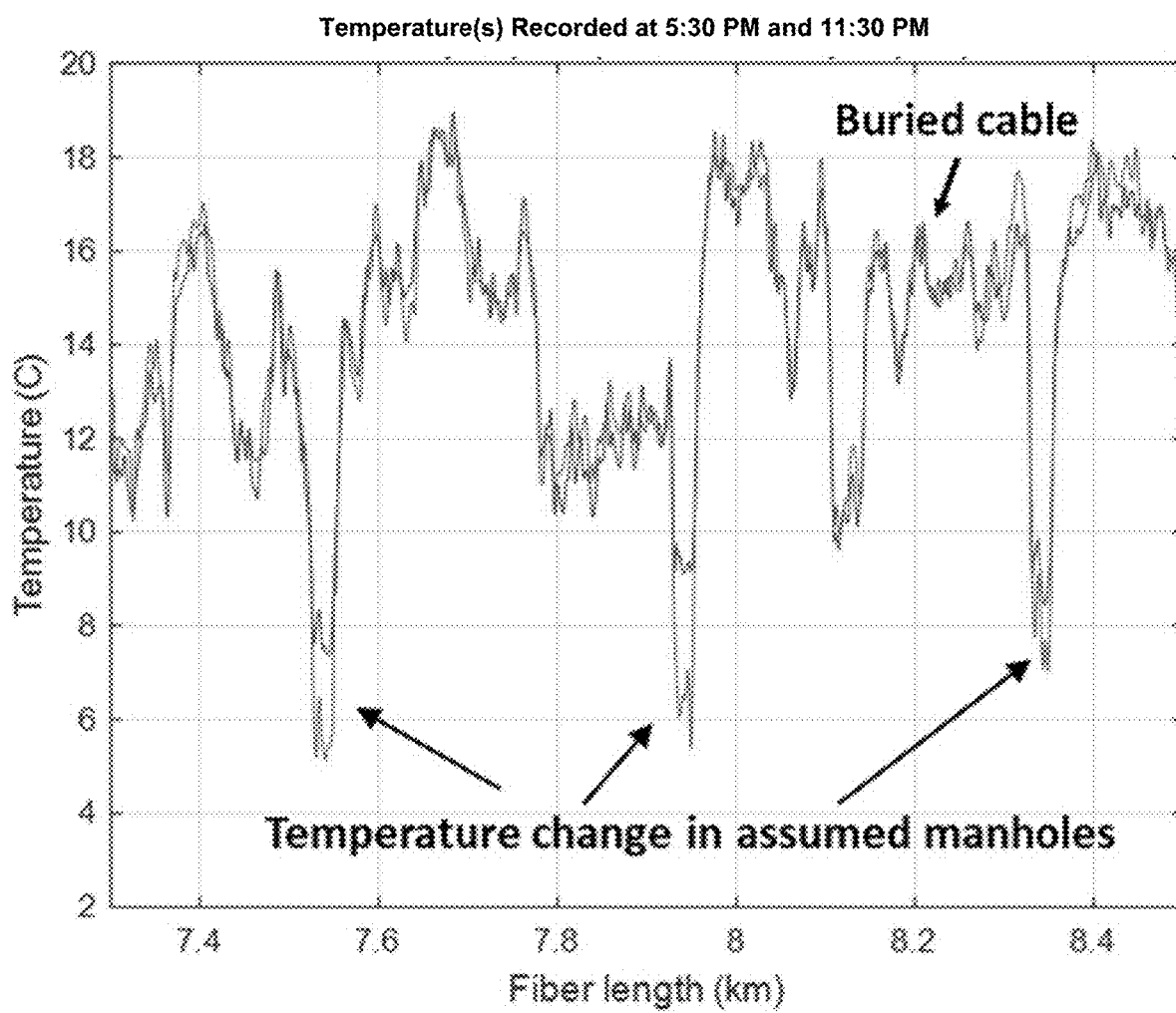
Figure 2B:
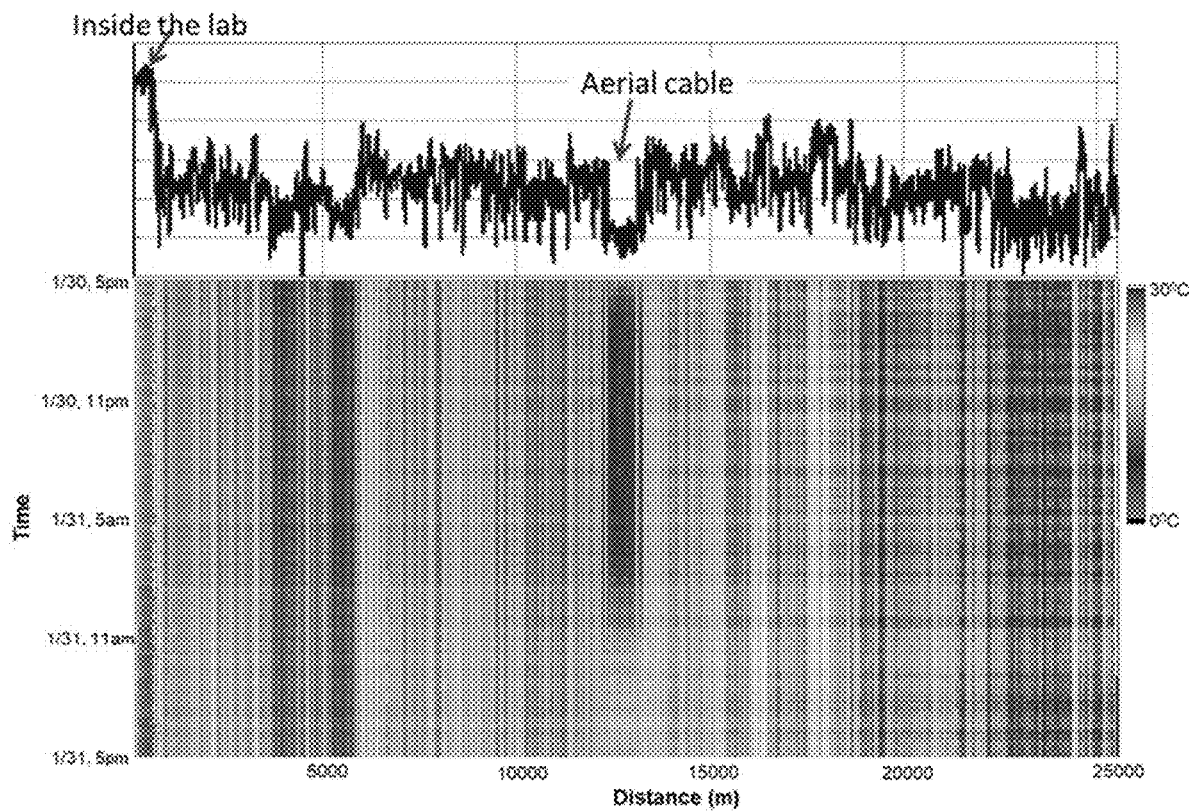

FIG. 2(A) and FIG. 2(B) are plots showing example distributed temperature sensing (DTS) results to determine/allocate locations of: FIG. 2(A) single trace determination of manholes and buried cables; and FIG. 2(B) 24 hour determination of aerial cables according to aspects of the present disclosure.

As may be observed from those figures, by comparing the temperature(s) in the evening (5:30 PM) and midnight (11:30 PM), the manholes/handholes may be identified based on larger temperature swings as compared to optical fiber buried at 48 inches during daytime and nighttime. Note further that sections of aerial cable may be determined based on measured temperature swings as well. As may be appreciated, locations of the manholes/handholes and aerial cable are clearly indicated in the plots which can be advantageously employed for physical optical fiber (cable) position calibration. Those skilled in the art will readily understand and appreciate that while optical time domain reflectometry (OTDR) may be used to determine fiber length, knowing the location(s) of manhole(s)/handhole(s) and aerial cable lengths provides more useful information when evaluating fiber deployed in the telecommunications network (field).

According to yet another aspect of the present disclosure, we have determined that based on our temperature swing measurement(s), it is possible to determine the environmental conditions existing within the manhole(s)/handhole(s) at a given time. Such environmental condition information about the manhole(s)/handhole(s) is of particular concern for telecommunications carriers—particularly in winter season(s)—as such information may provide insight into any damage due to frozen water (ice) which in turn may induce telecommunications transmission performance degradation(s).

Figure 3A:
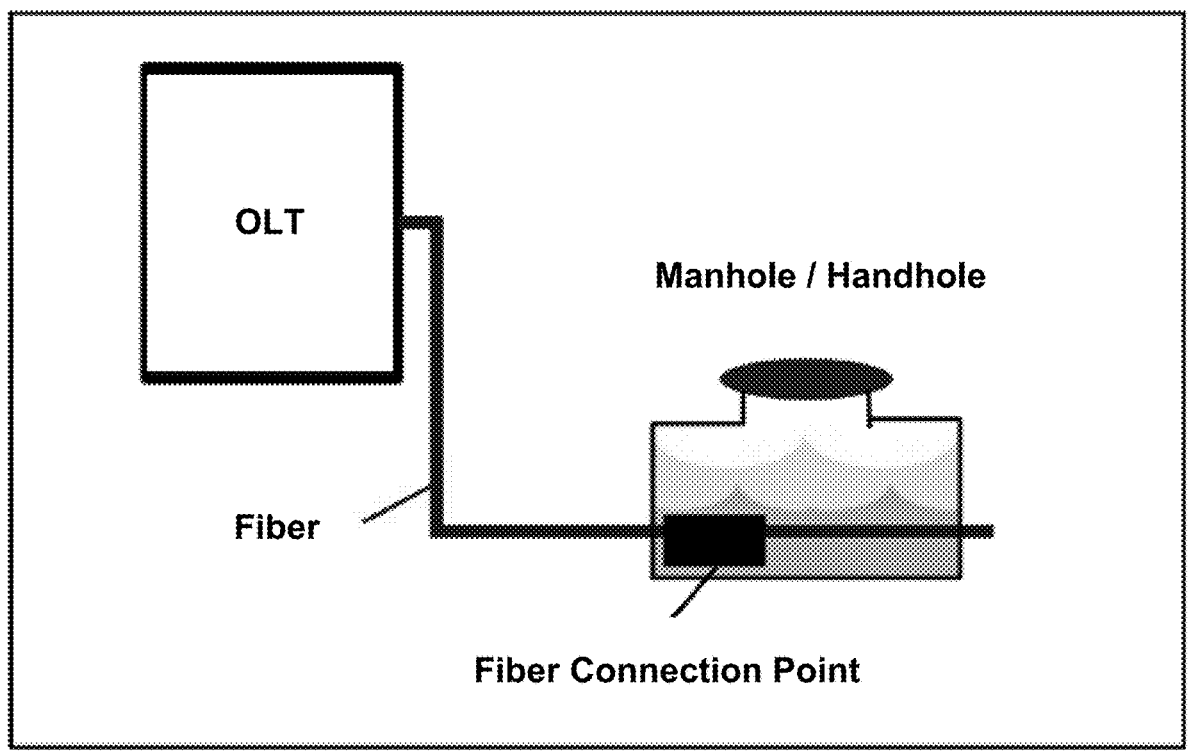
FIG. 3(A) is a schematic diagram illustrating fiber temperature sensing architecture from OLT to Manhole/Handhole according to aspects of the present disclosure.

FIG. 3(A) is a schematic diagram illustrating fiber temperature sensing architecture from OLT to Manhole/Handhole according to aspects of the present disclosure. As may be observed from that figure, an OLT is shown in optical communication with deployed optical fiber that passes through manhole(s)/handhole(s) and may include one or more fiber connection point(s) to which the fiber is spliced and signals conveyed are distributed. As we shall show and describe, systems, methods, and structures according to aspects of the present disclosure may advantageously determine the location(s) of such manhole(s)/handhole(s) within the fiber plant thereby facilitating its maintenance.

Figure 3B:
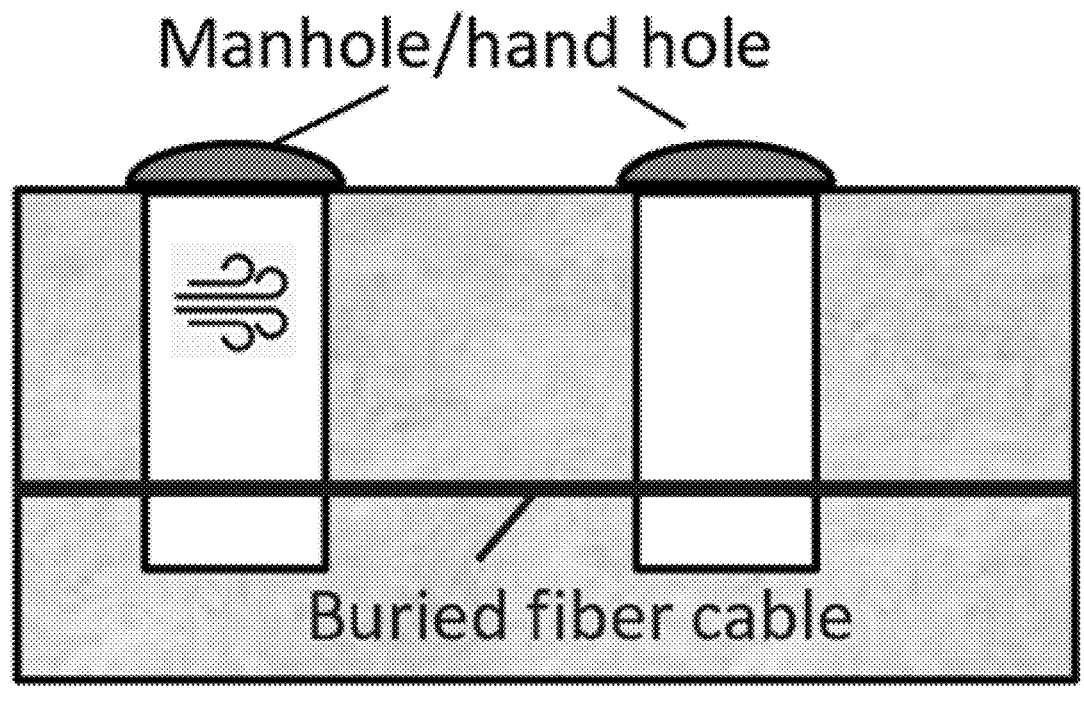
FIG. 3(B) is a schematic diagram illustrating fiber temperature sensing for Manhole/Handhole and a plot of temperature vs distance as measured during daytime and nighttime for a normal/dry Manhole/Handhole according to aspects of the present disclosure.
Figure 3B:
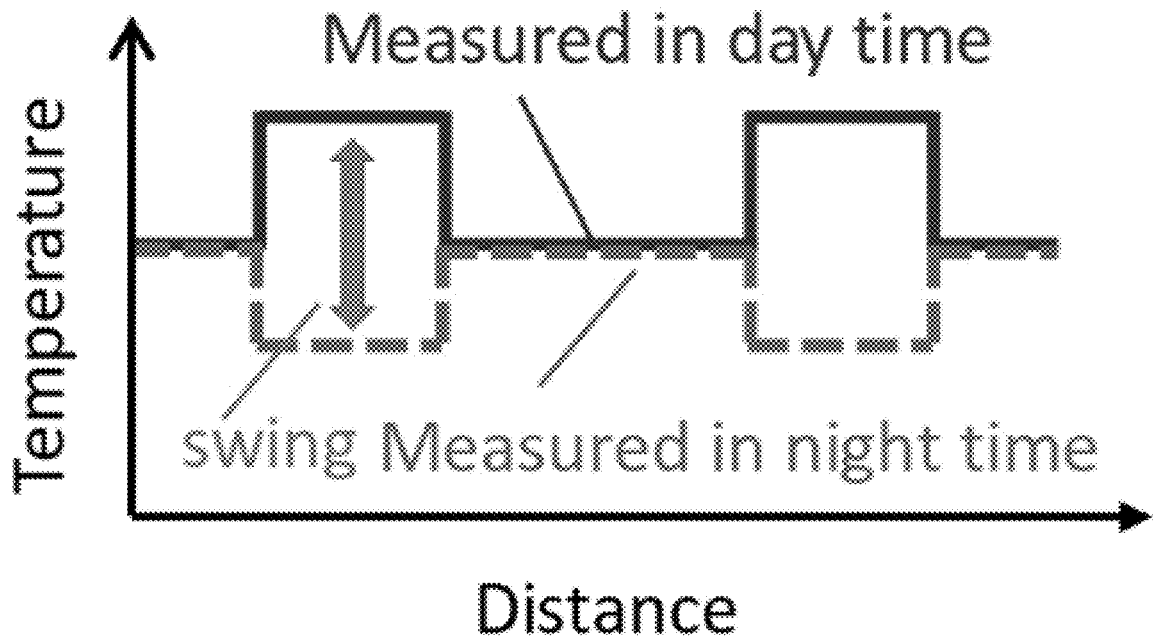
Figure 3C:
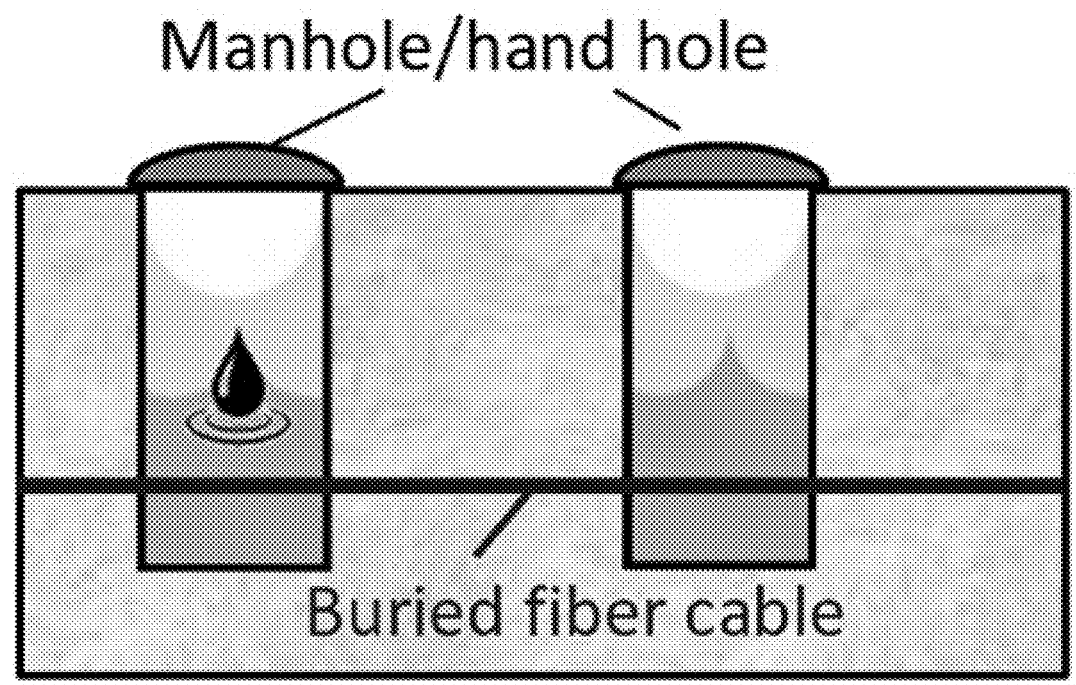
FIG. 3(C) is a schematic diagram illustrating fiber temperature sensing for Manhole/Handhole and a plot of temperature vs distance as measured during daytime and nighttime for a flooded Manhole/Handhole according to aspects of the present disclosure.
Figure 3C:
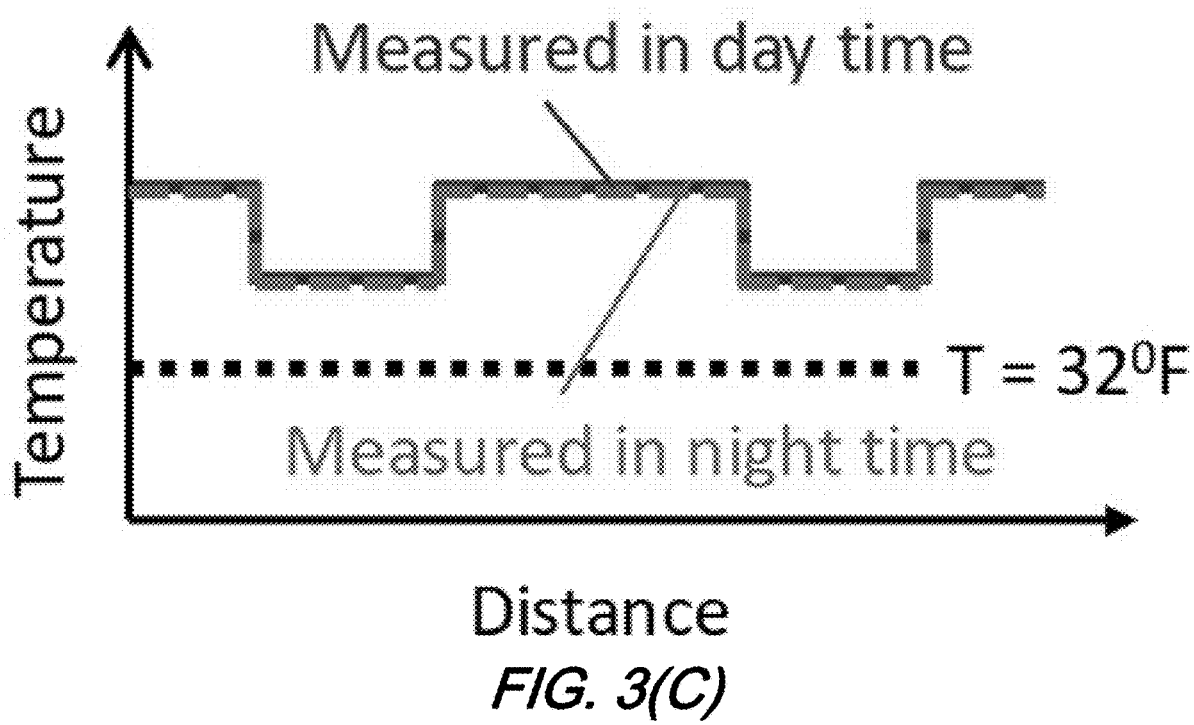
Figure 3D:
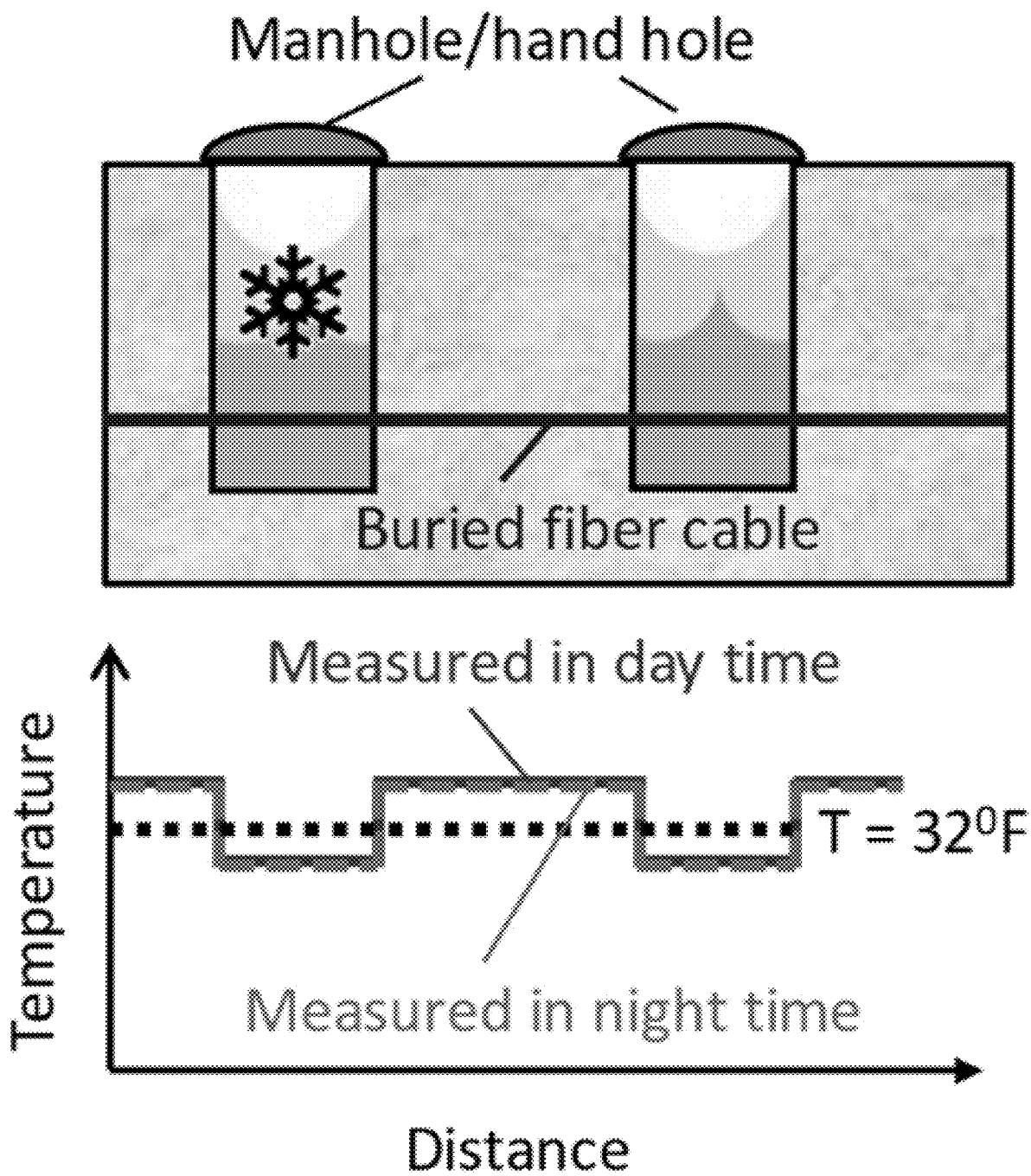
FIG. 3(D) is a schematic diagram illustrating fiber temperature sensing for Manhole/Handhole and a plot of temperature vs distance as measured during daytime and nighttime for a frozen/iced Manhole/Handhole according to aspects of the present disclosure.
Figure 3E:
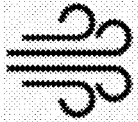
FIG. 3(E) is a diagram illustrating in tabular form day fiber temperature sensing for Manhole/Handhole day/night temperature swing(s) and temperature range(s) for normal/dry, flooded, and frozen Manhole(s)/Handhole(s) according to aspects of the present disclosure.
Figure 3E:
Figure 3E:

FIG. 3(B) is a schematic diagram illustrating fiber temperature sensing for Manhole/Handhole and a plot of temperature vs distance as measured during daytime and nighttime for a normal/dry Manhole/Handhole according to aspects of the present disclosure. FIG. 3(C) is a schematic diagram illustrating fiber temperature sensing for Manhole/Handhole and a plot of temperature vs distance as measured during daytime and nighttime for a flooded Manhole/Handhole according to aspects of the present disclosure. FIG. 3(D) is a schematic diagram illustrating fiber temperature sensing for Manhole/Handhole and a plot of temperature vs distance as measured during daytime and nighttime for a frozen/iced Manhole/Handhole according to aspects of the present disclosure. FIG. 3(E) is a diagram illustrating in tabular form day fiber temperature sensing for Manhole/Handhole day/night temperature swing(s) and temperature range(s) for normal/dry, flooded, and frozen Manhole(s)/Handhole(s) according to aspects of the present disclosure.

With simultaneous reference to this set of figures, it may be observed that during somewhat "normal" conditions, the inside of any manhole(s)/handhole(s) is dry and reflective/indicative of ambient (air) temperature as well. Accordingly, the temperature(s) experienced inside the manhole(s)/handhole(s) will undergo the same or similar larger temperature swings as ambient with larger swings during daytime and nighttime. However, as if the manhole(s)/handhole(s) are flooded and/or filled with water, the temperature swing during the daytime and the nighttime is small(er)—or no change—while the temperature(s) remain above 32 degrees F. Conversely, in a situation wherein detected temperature(s) are lower than 32 degrees F. with small temperature swings during the daytime and nighttime, it may be determined that the condition(s) within the manhole(s)/handhole(s) include icing and/or are frozen. Such conditions are outlined in tabular form in FIG. 3(E).

Advantageously, systems, methods, and structures according to aspects of the present disclosure may be employed to determine road/roadway/highway surface temperatures continuously with slight modifications.

Figure 4:
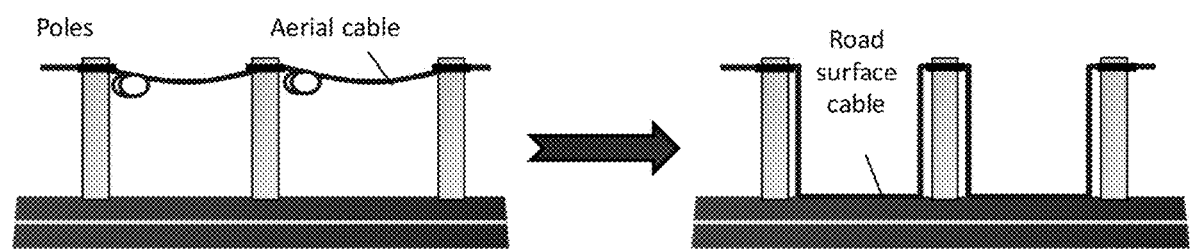
FIG. 4 is a schematic diagram illustrating deployed telecommunications cable employed for distributed sensing of road surface temperature monitoring according to aspects of the present disclosure.

FIG. 4 is a schematic diagram illustrating deployed telecommunications cable employed for distributed sensing of road surface temperature monitoring according to aspects of the present disclosure. Note that in the figure the aerial optical fiber cable overhangs the roadway surface—or is adjacent—and therefore provides no ability to directly measure the roadway temperature. Note further that the aerial fiber may include loops of additional fiber coils. Operationally, since a typical optical telecommunications infrastructure includes such additional fiber lengths, they may be reconfigured from aerial to ground as road surface fiber cable thereby providing direct measurement of the roadway surface. Note further that in those situations where insufficient length(s) of fiber or unsuitable fiber (certain aerial fiber may not be suitable for underground) are configured aerially, lengths of suitable fiber may be spliced to the aerial fiber and disposed along the roadway such that it provides the necessary fiber for DTS or other measurements. When so deployed or reconfigured, such roadway fiber may be employed to determine road surface temperatures to understand pavement distress, or to provide traffic information via vibration sensing mechanisms conveyed via the optical fiber.

Figure 5:
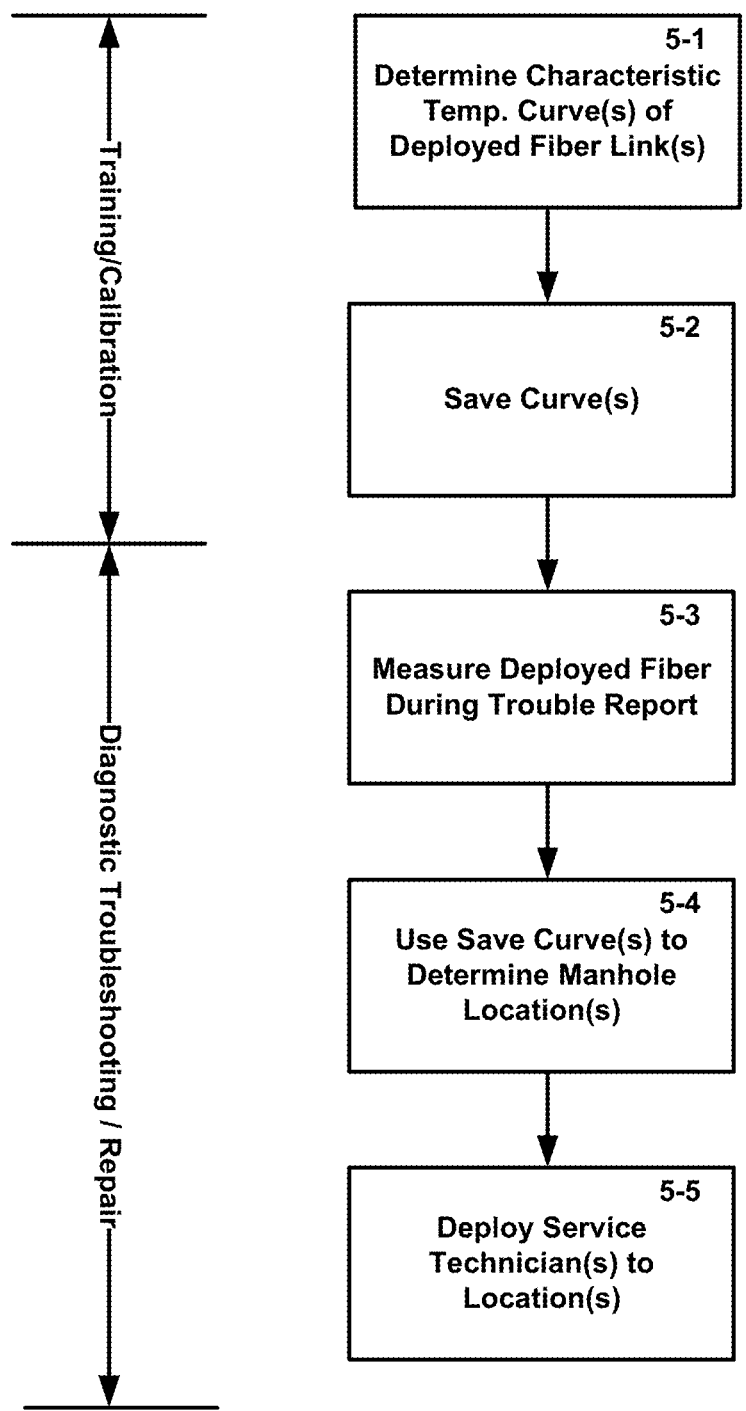
FIG. 5 is a flow diagram illustrating overall process/method according to aspects of the present disclosure.

FIG. 5 is a flow diagram illustrating overall process/method according to aspects of the present disclosure. With reference to that figure we note that at Block 5-1 a determination is made of characteristic DOFS (i.e., temperature) curve(s) for a given deployed optical fiber length. Such curve(s) may include data of temperature vs fiber length and or time vs distance(s) as shown and described previously. At Block 5-2, the data comprising the curves is saved in a convenient form. Such activities may collectively comprise a calibration and/or training phase of operation.

During diagnostic troubleshooting/repair procedures encountered—perhaps as a result of a trouble indication generated by the carrier or customer—the deployed fiber is measured at Block 5-3 during such period of trouble and is then compared at Block 5-4 with the curves previously collected/saved. From those comparisons, manhole/handhole locations may be determined and technicians may be deployed to those determined locations at Block 5-5 for field investigation/evaluation/repair as necessary.

We may now show and describe—for the first time—aspects of the present disclosure applied to live optical telecommunications networks carrying high-speed data such that the networks simultaneously provide data about vehicle speed, density, and road conditions. The fiber seeing function(s) employed in our experimental trial setup is uses phase-sensitive optical time-domain reflectometry (OTDR) technology for vibration detection—i.e., distributed vibration sensing. Our results show that operational fiber in carriers' networks are capable to detect vehicle speed, vehicle flow and pavement deterioration in roadways—such as the existence of potholes.

Of particular significance the distributed vibration sensing is simultaneously performed on an operational optical network carrying live, high-speed, data traffic—i.e., a coexisting optical fiber sensing system/data network.

Figure 6A:
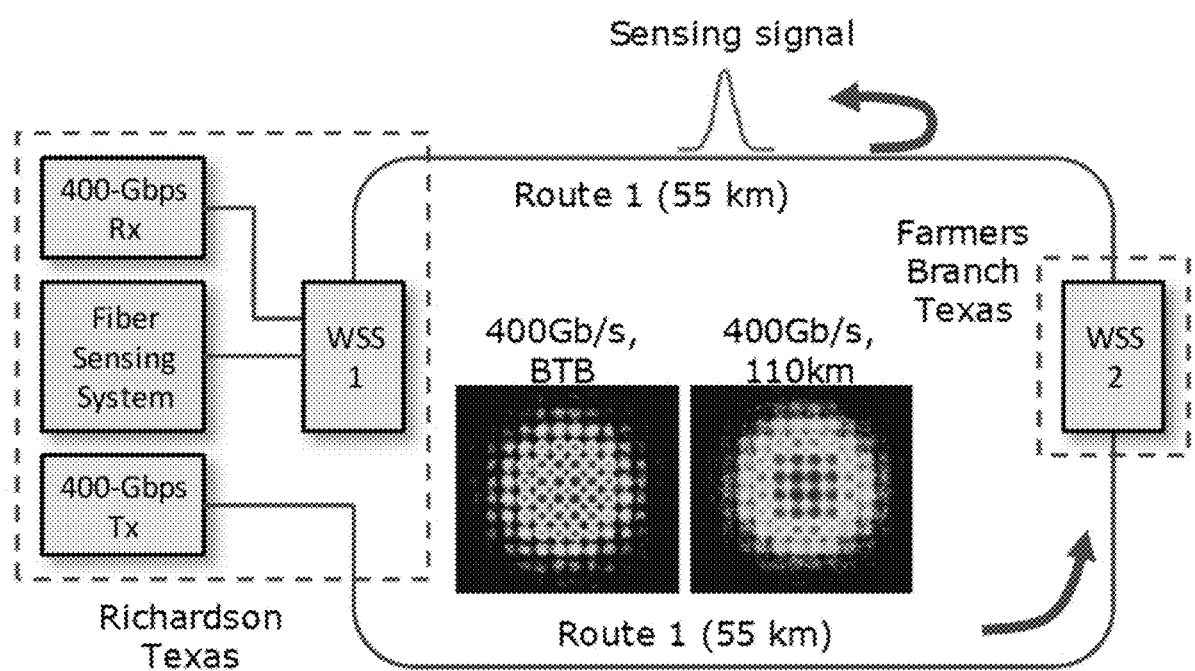
FIG. 6(A) shows a schematic diagram of an illustrative experimental arrangement of a coexisting sensing/telecommunications network according to aspects of the present disclosure.

The experimental setup for the coexisting fiber sensing system/data configuration is shown schematically in FIG. 6(A). As may be observed from that figure, the fiber communication channels are a full C-band dense wavelength division multiplexed (DWDM) system, wherein each channel is modulated with 48-Gbaud PS DP-144QAM. The system employs 50-GHz spaced channels that support transmission of >400 Gb/s net channel data rate with an average spectral efficiency of 8.4 b/s/Hz.

As will be readily appreciated by those skilled in the art, the distributed fiber optic sensing system (DFOS) provides up to many thousands of "virtual sensors" over 80 km that advantageously provide sensitivity data resulting from dynamic strain(s) on the optical fiber(s). Operationally, the DFOS system measuring the change in intensity of Rayleigh scattering via interferometric phase beating in the optical fiber. Advantageously, no special reflectors or fiber Bragg gratings are required along the length of the entire optical fiber (cable). The DFOS sensing system advantageously employs short optical pulses along with on-chip fast processing to enable an equivalent sensor resolution as small as 1 meter.

Figure 6B:
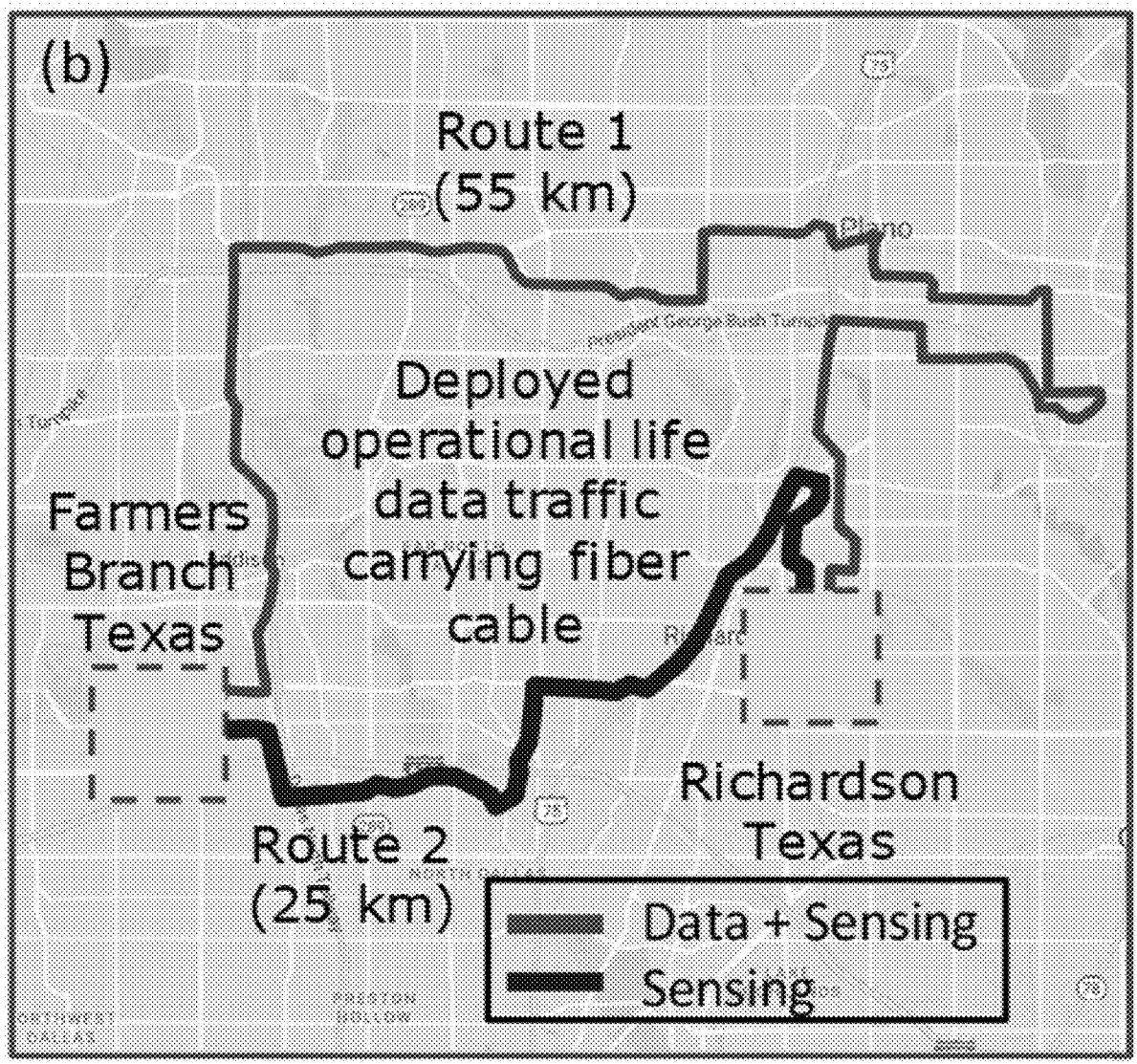
FIG. 6(B) shows a schematic map of the illustrative experimental coexisting sensing/telecommunications network of FIG. 6(A) according to aspects of the present disclosure.
Figure 6C:
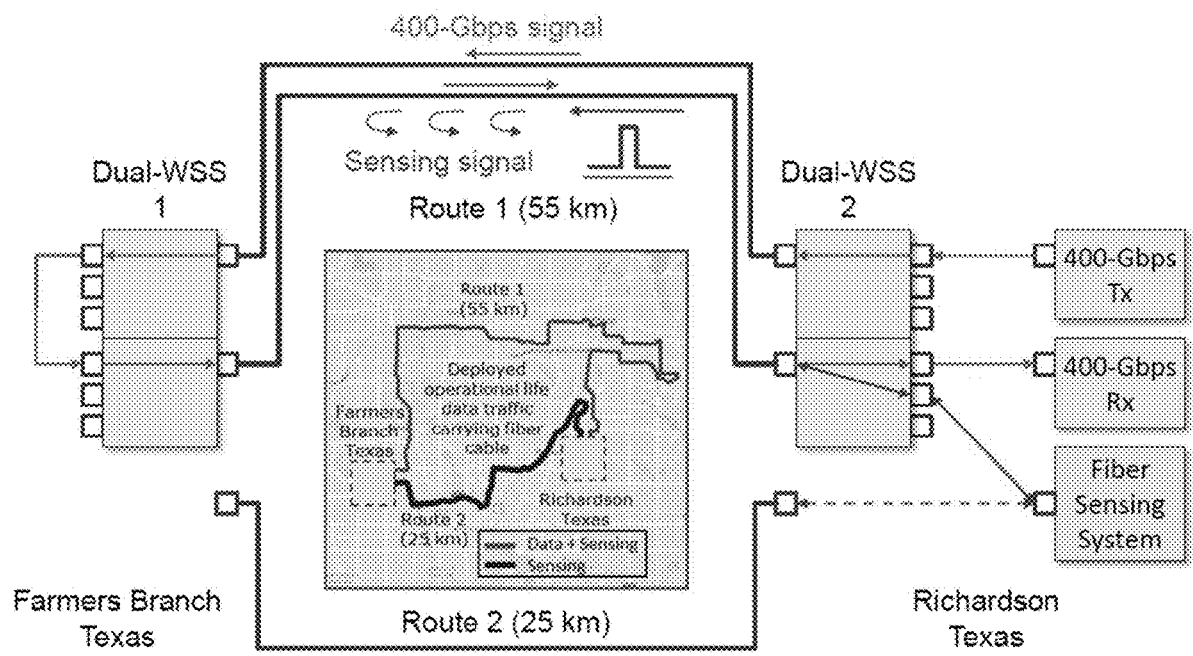
FIG. 6(C) shows a combined schematic map of the illustrative experimental coexisting sensing/telecommunications network of FIG. 6(A) according to aspects of the present disclosure.

FIG. 6(B) shows a schematic map of the illustrative experimental coexisting sensing/telecommunications network of FIG. 6(A) according to aspects of the present disclosure while FIG. 6(C) shows a combined schematic map of the illustrative experimental coexisting sensing/telecommunications network of FIG. 6(A) according to aspects of the present disclosure.

With simultaneous reference to those figures, it may be observed that the fiber link in the Dallas, Tex. area includes 55 km (Route 1) and 25 km (Route 2) spans of standard single mode fiber (SSMF) optically connecting a lab (in Richardson) and remote site (Farmers Branch). The 55-km route was used for coexisting fiber sensing/data while the 25-km one only for sensing signals. The fiber is located inside a 432-fiber cable with 1-inch diameter. Most of the cable is buried at depth of 36-48 inches (0.9-1.2 m).

For testing the coexisting fiber sensing/data system, two 55-km routes were connected back-to-back to achieve 110-km 400 Gb/s DWDM transmission while one 55 km segment is shared with the sensing signal. As shown in the figures, the communication channels and the fiber sensing signal travel through the same physical optical fiber. The high power pulses emitted by the fiber sensing system propagate in an opposite direction of the DWDM signal in order to reduce fiber nonlinearity crosstalk.

We reserved three 50-GHz optical channel bands for the backward fiber sensing operation. Two wavelength selected switches (WSS) were used to multiplex the communication signal and the sensing signal. The WSSs also filter out the in-band ASE noises generated by intermediate amplifiers used for communication. As will be appreciated by those skilled in the art, the total capacity of high speed data transmission is 36.8 Tb/s. For one channel that is closest to the sensing signal, the back-to-back and the received PS DP-144 QAM signal constellation after coherent detection and DSP is inserted as shown in the figure. Error free operation (BER<$2.2 \times 10^{-2}$) was achieved after FEC decoding for 400-Gb/s data rate after 110-km transmission. Advantageously, and perhaps somewhat surprisingly, no perceptible signal degradation was observed before and after the sensing signal was inserted.

Figure 7A:
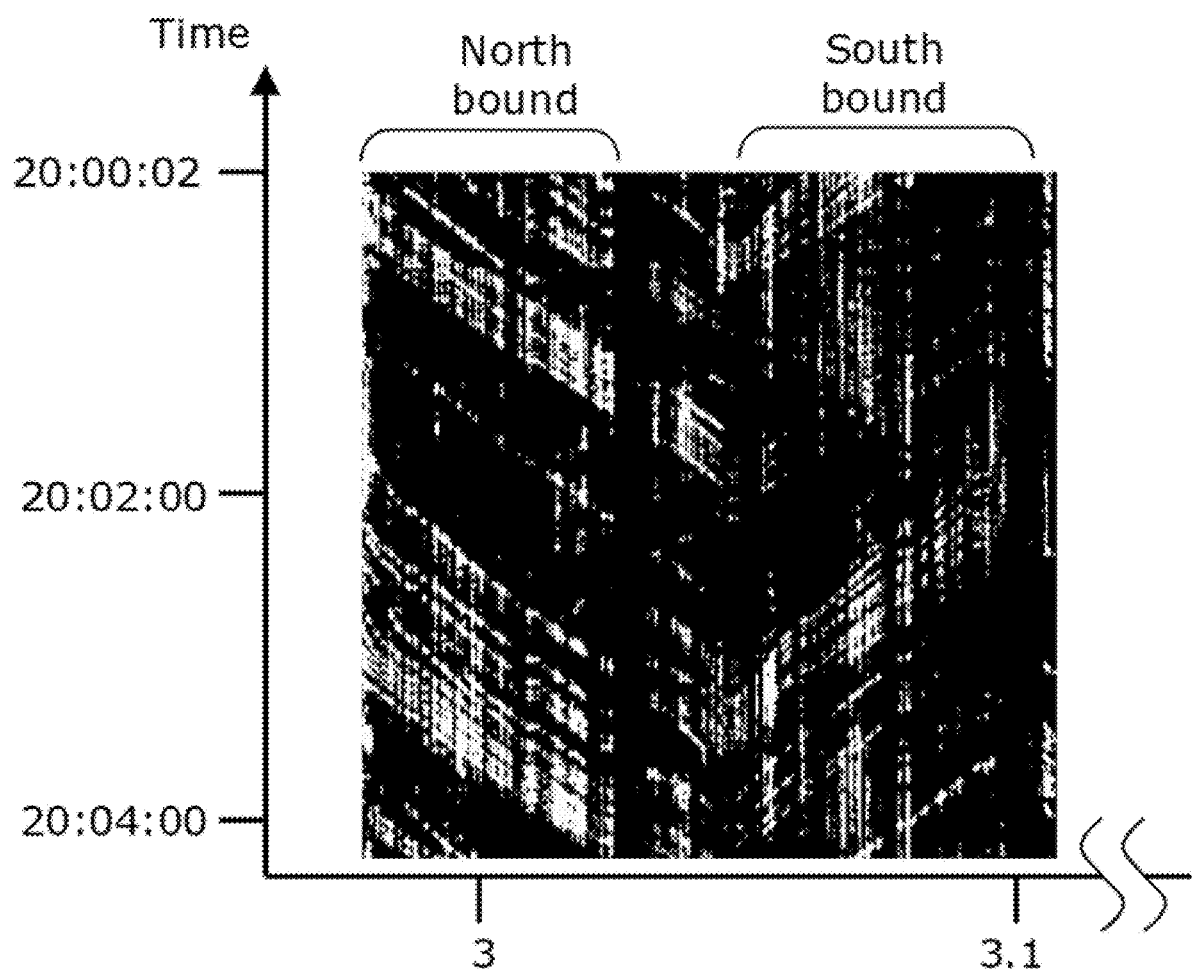
FIG. 7(A) and FIG. 7(B) are waterfall traces for fiber experimental coexisting sensing/telecommunications network at various time(s)/distance(s) according to aspects of the present disclosure.
Figure 7B:
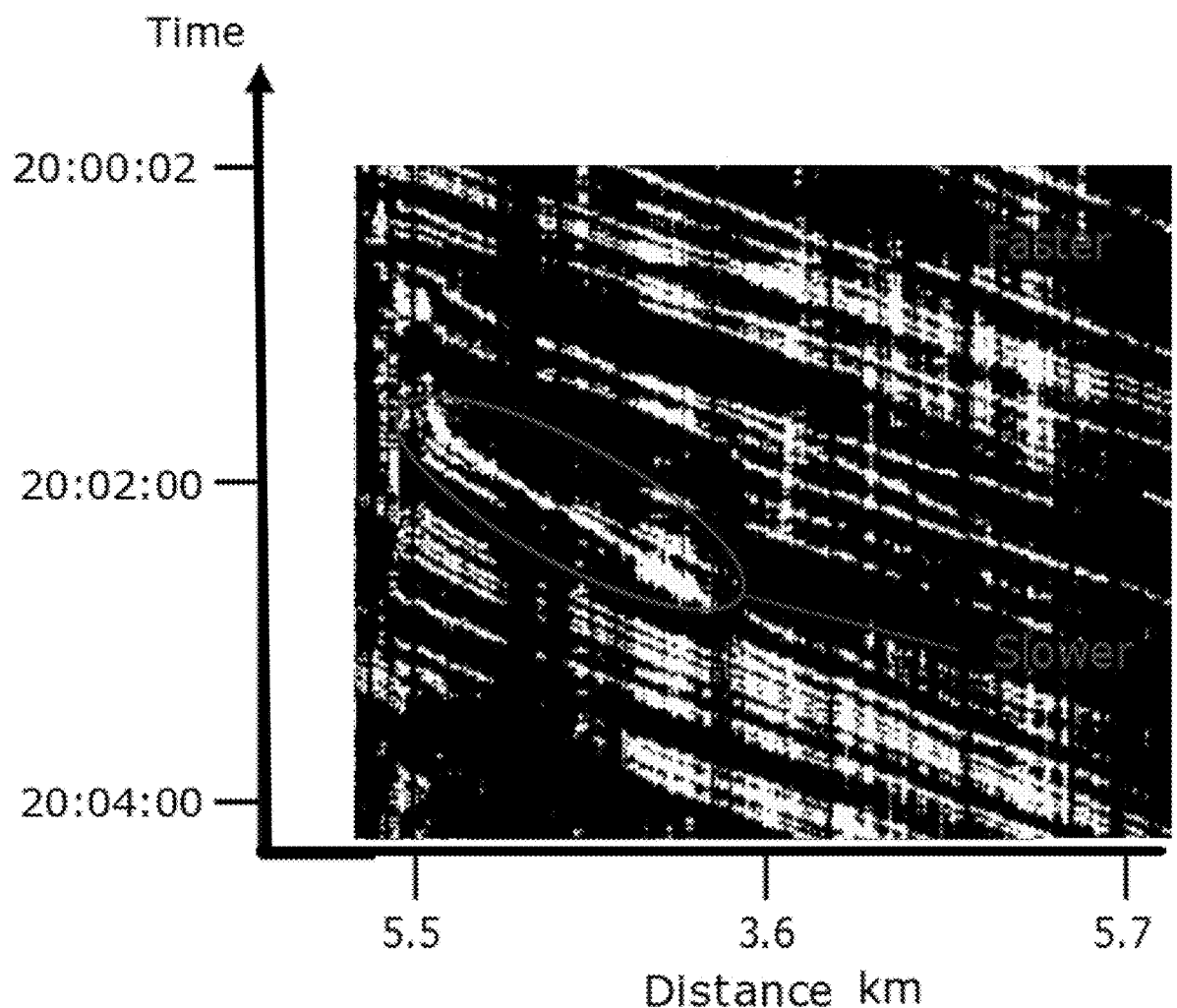

FIG. 7(A) and FIG. 7(B) are waterfall traces for fiber experimental sensing functions over telecommunications network at various time(s)/distance(s) according to aspects of the present disclosure. The traces shown are examples of 4-minute waterfall traces for two locations. The vibration patterns extracted from a waterfall trace act for traffic flow caused by passing vehicles. It is corresponding to driving direction, driving speed and vehicle weight. With help of A.I. (artificial intelligence), the information was extracted to show the traffic patterns. FIG. 7(A) shows the vehicle moving direction for north and south bounds at the location of 3 km. Due to the slope of the trace, the speed of the vehicle also can be detected. As illustratively shown in FIG. 7(B), one slower car was discovered between the regular traffic based on different slope of the trace.

Figure 8A:
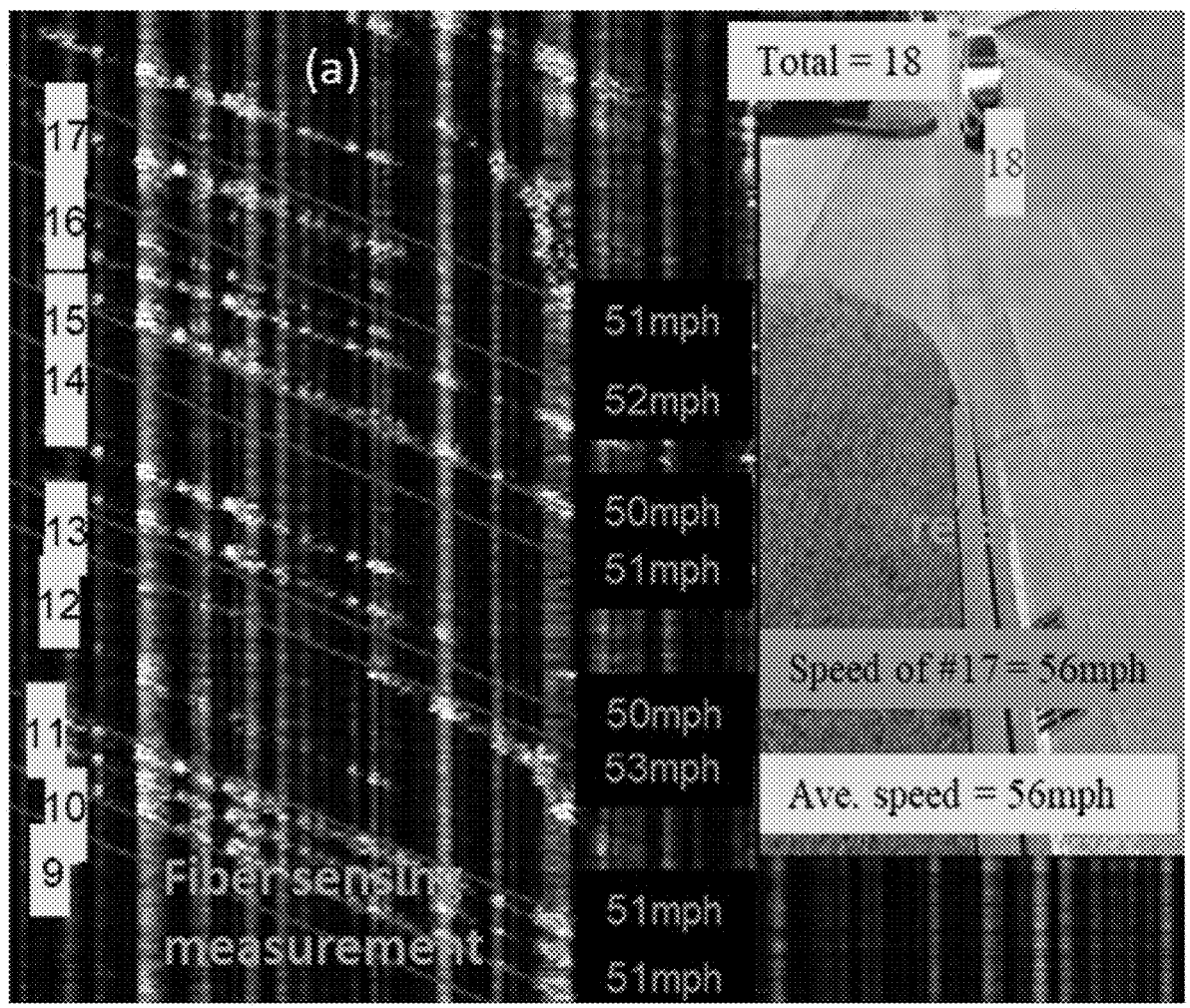
Figure 8B:
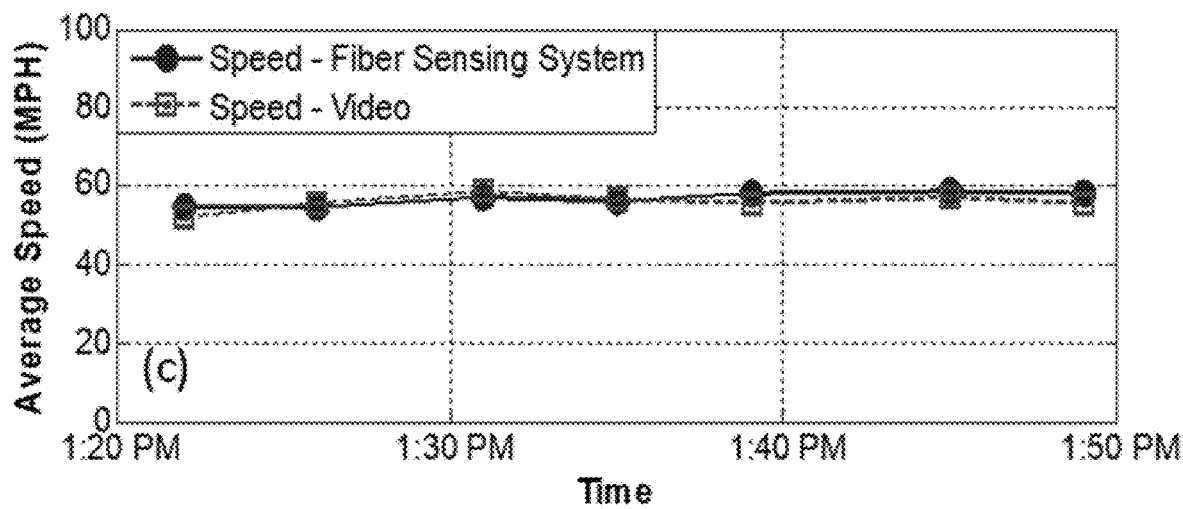
Figure 8C:
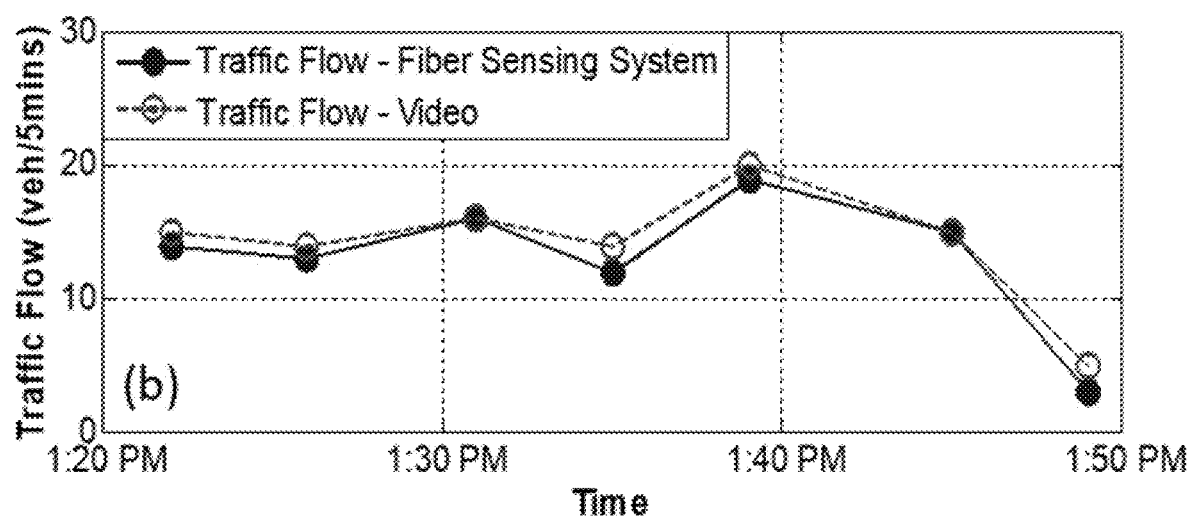

Counting of vehicles and speed estimation were achieved by detecting and tracing vibration through deployed fiber near roads. FIG. 8(A), FIG. 8(B), and FIG. 8(C) show traffic information of vehicle volumes and average speed on a targeted public road which is a three-lane expressway close to Rt. 75 in Texas. The location was selected based on high SNR (signal-to-noise ratio) of sensing signal (around 21 dB) as compared to other locations with SNR of <18 dB. The higher SNR may result from optical fiber cable location and ground condition which allows more seismic wave coupled into the optical fiber cable.

The example (screen capture from the analysis with A.I.) is shown in FIG. 8(A) for fiber sensing measurement—using video analytics as a reference. It displays the performance of the developed algorithm by extracting the information from the waterfall diagram against a video based algorithm for traffic analysis.

For our proof of concept and evaluation of our inventive systems, methods, and structures according to the present disclosure, a short period of video was analyzed which accumulated traffic flow over a 5 minute interval and averaged the vehicle speed in the same period. FIG. 8(B) and FIG. 8(C) are graphs that show comparisons for speed measurement and vehicle density. Based on the analyzed result, the average vehicle speed obtained from fiber sensing system is very close to that counted by the video with a difference less than 1.5%, while the difference of the total traffic count is less than 6.5%. As will be appreciated by those skilled in the art, our results show great promise fiber sensing system(s) according to aspects of the present disclosure.

Figure 8D:
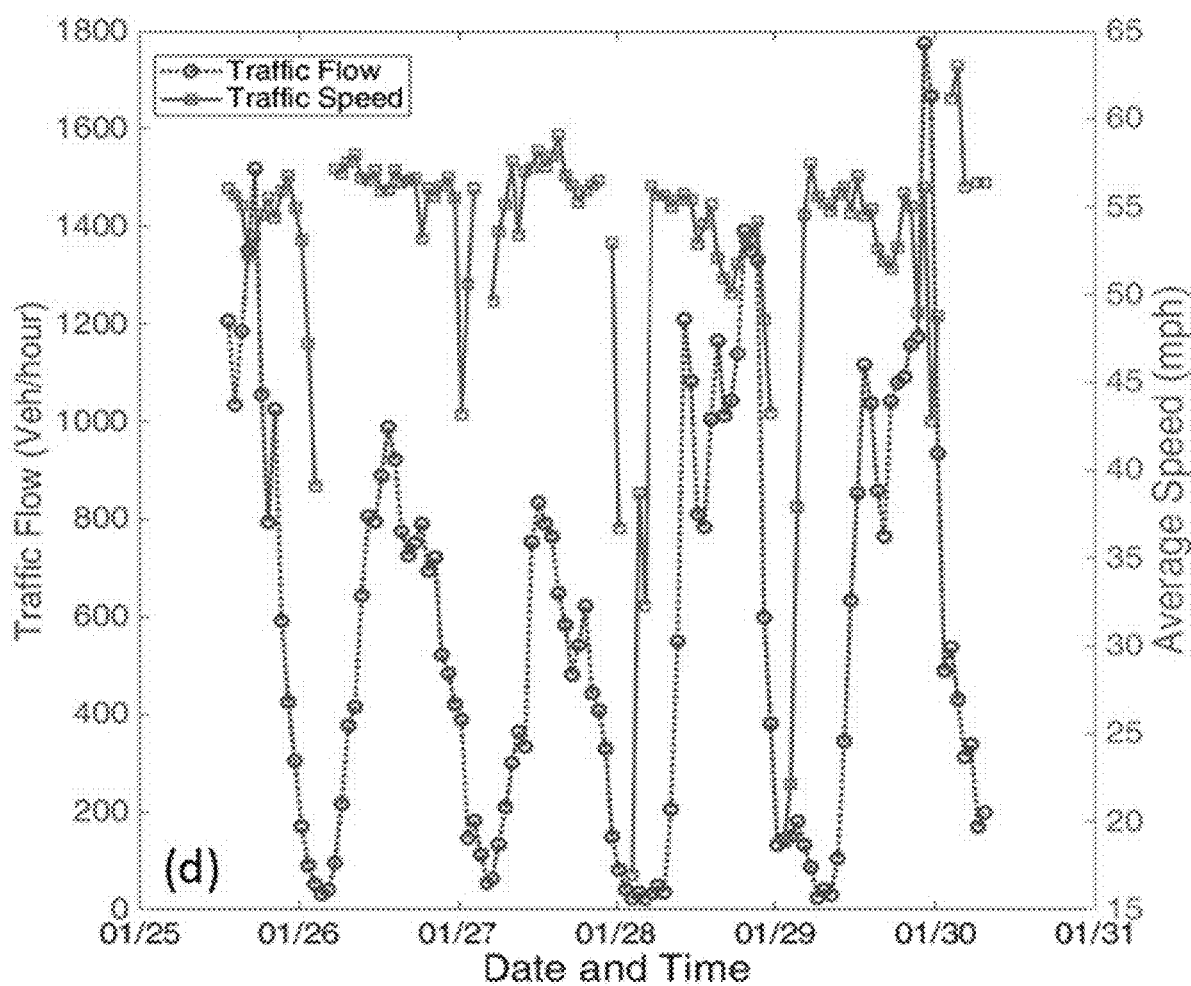

FIG. 8(D) is a graph showing traffic monitoring data for a 5 days period collected from 1 pm, Jan. $25^{th}$ to 10 am, Jan. $30^{th}$. The traffic flow was accumulated every hour while the vehicle speed was averaging in the same period. During a total 5-day measurement, we detected 68,743 vehicles passed the targeted detection section with average speed of 57 MPH. The clear traffic patterns of daily and weekday/weekend is shown by the measurement.

FIG. 9(A), FIG. 9(B), and FIG. 9(C) are graphs illustrating a road surface quality as determined by the optical fiber sensing system according to aspects of the present disclosure. The selected road has three different types of surface condition: good (smooth, orange color)), fair (2 potholes, blue color) and poor (many asphalt fillings, pink color). During our measurement period, regular traffic on the road was employed as "source" of vibration for the tests.

FIG. 9(A) displays reference data produced by a tri-axial accelerometer attached to the chassis of a car (under the suspension) which is the same as traditional road survey methods. FIG. 9(B) and FIG. 9(C) show the intensity plot and waterfall trace, respectively, from the experimental fiber sensing system which indicates the locations of potholes and their fillings based on stronger seismic wave coupled into the fiber. High correlation can be seen between where/when the accelerometer detected vibrations from the car and ground vibration picked up by the optical fiber sensing system.

At this point we have demonstrated and disclosed the first coexisting system of 36.8 Tb/s data transmission and distributed optical fiber sensing through an operational optical fiber telecommunications network. By detecting change(s) in intensity of Rayleigh scattering via interferometric phase beating in the optical fiber, detections of road condition, vehicle density and speed are achieved. Vehicles, which are operating from 30-45 feet away from the optical fiber cables buried at depth of 36-48 inches, can advantageously be sensed with the technology. Furthermore, we obtained an accuracy of 94.5% for moving vehicle density measurement and 98.5% for speed measurement. Such disclosure opens a new era to use existing, live, data-carrying optical fiber telecommunications infrastructure to provide sensor functions which advantageously promotes further smart city/community applications in near future.

We note once again that we have described and demonstrated the first sensing network on operational, live network, high data rate, telecommunications networks. By leveraging Rayleigh and Raman backscattering, any related physical properties, such as vibration, temperature and acoustic effects can be sensed at every point along the entire fiber cable. Advantageously, systems, methods, and structures according to aspects of the present disclosure may advantageously permit city traffic monitoring to applied on future road design and traffic signal planning. Environmental temperature monitoring can be used for micro-temperature measurement providing more localized temperature information comparison to weather stations.

While we have presented this disclosure using some specific examples, those skilled in the art will recognize that our teachings are not so limited. Accordingly, this disclosure should be only limited by the scope of the claims attached hereto.

The invention claimed is:

1. A method of performing optical fiber sensing over an optical fiber network, the network comprising:
   a length of optical fiber; and
   an optical interrogator unit that generates optical pulses, introduces them into the optical fiber and receives backscattered signals from the fiber;
   the method comprising:
      generating one or more characteristic curves of the optical fiber by distributed optical fiber sensing (DOFS);
      associating the generated curves with particular locations along the optical fiber;
      generating a fiber trouble location by optical time domain reflectometry (OTDR);
      associating the generated curves and locations with the OTDR generated trouble location; and
      identifying a specific trouble location from the associated curves and OTDR generated trouble location.

2. The method of claim 1 further comprising:
   generating the characteristic curves at multiple time(s) of a given day.

3. The method of claim 2 further comprising determining aerial and underground fiber locations from the characteristic curves.

4. The method of claim 2 further comprising:
   determining manhole/handhole conditions from the characteristic curves.

5. The method of claim 4 wherein the determined manhole/handhole conditions are selected from the group consisting of normal, flooded, and frozen.

6. The method of claim 5 wherein the DOFS is a temperature measurement.

* * * * *